United States Patent Office 2,900,945
Patented Aug. 25, 1959

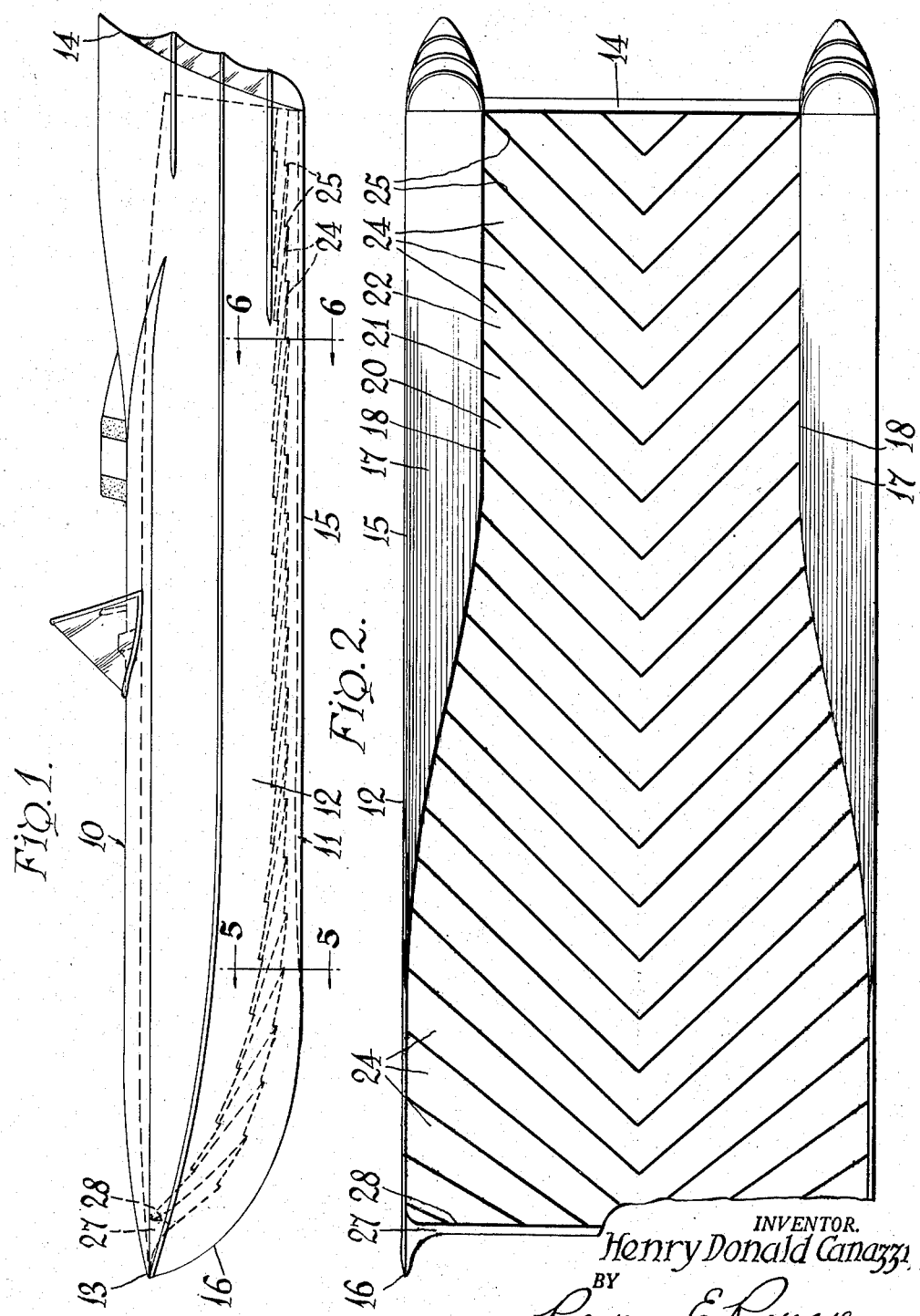

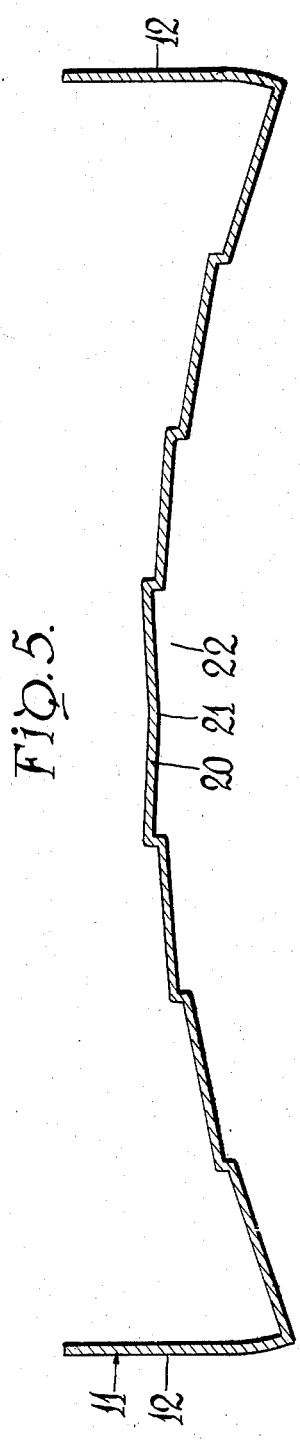
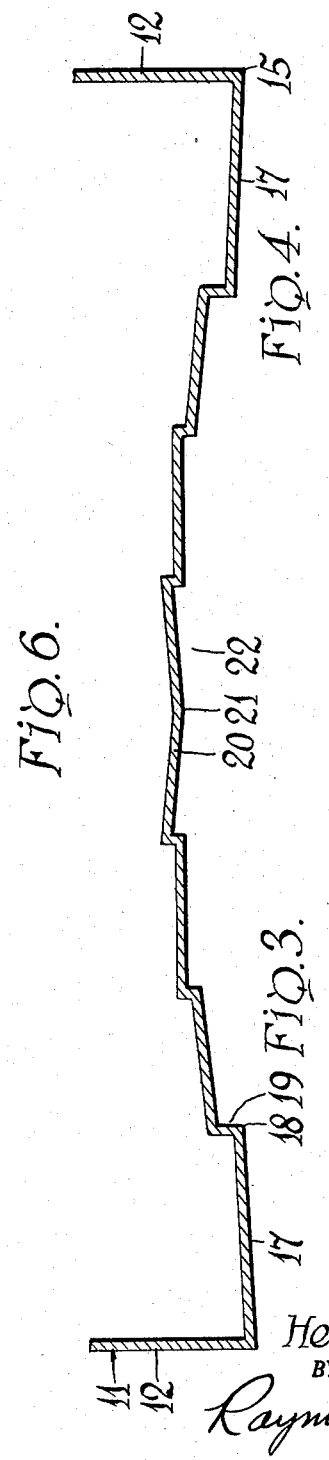
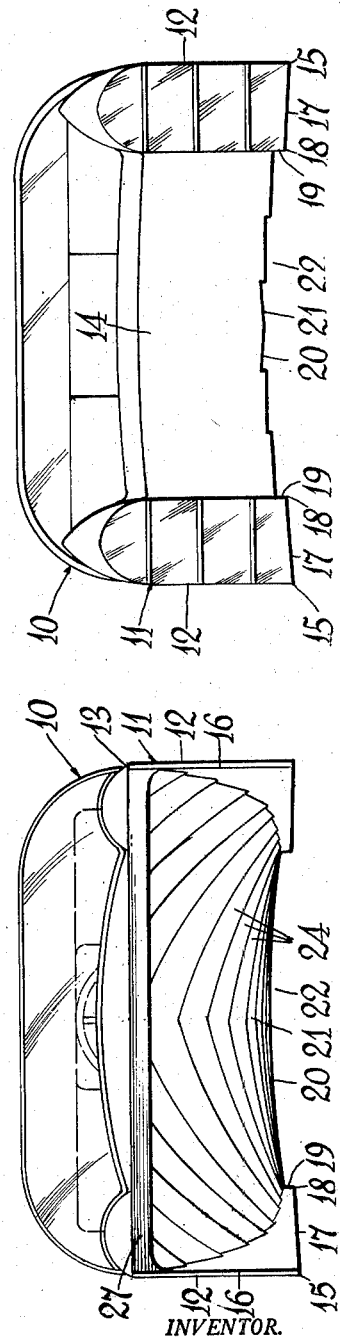
INVENTOR.
Henry Donald Canazzi
BY
Raymon E. Rousseau.
ATTORNEY

2,900,945

SPEED BOAT HULLS

Henry Donald Canazzi, Buffalo, N.Y.

Application February 13, 1957, Serial No. 640,028

8 Claims. (Cl. 114—66.5)

My invention relates to boat hulls and more particularly to improvements in power driven planing type of boat hulls capable of high speeds.

Prior boat hulls have been designed to attain high speeds but have not been entirely satisfactory for a number of reasons, several reasons being that such prior hulls have been more or less unstable, yaw considerably and have been difficult to control and accurately maneuver, particularly during their planing speed phase of operation. Another reason is that during forward motion some prior hulls displace water outwardly and this water, together with the water displaced by oscillation of the hull, especially at higher speeds and in quartering winds, creates spray which enters and wets the interior surfaces of the hull. Other types of hulls, known as catamarans and sea sleds, displace water and air inwardly during their forward motion but do not advantageously utilize the energy of such displaced water and air to improve their speed and other qualities.

An object of my invention is to provide a planing type of boat hull with surfaces formed to effect the transition from its non-planing speed phase to its planing speed phase quickly but smoothly and efficiently; another object is to provide a boat hull which is inherently stable, which is substantially yawless and spray free, which has less fore and aft oscillation than prior hulls, which is easy to control and which is accurately maneuverable at all speeds; another object is to provide a boat hull having a maximum of usable internal space; another object is to provide the bottom of a boat hull with a spaced pair of bow stems each located at one side of the hull to direct substantially all of the water and air displaced by forward motion of the hull inwardly and rearwardly beneath and against the bottom wall of a large area central recess or tunnel extending fore and aft from the bow to the stern of the hull and formed between the bow stems and a spaced pair of offset relatively small area planing surfaces; another object is to provide the bottom wall of the tunnel with a predetermined longitudinal curvature and transverse arching throughout its length and breadth and with a predetermined degree of upward offset with respect to the plane of the planing surfaces whereby the shape, area and volume of the tunnel is such that it continuously receives the predetermined quantities of water and air displaced rearwardly therethrough by and during forward motion of the hull and due to its shape, area and volume the energies of the displaced water and air, continuously acting against its entire surface, are converted into predetermined lifting effects on the hull, thereby causing the hull to plane quickly and smoothly, to attain and maintain a higher top speed with a given amount of driving force and to have better trim, stability and maneuverability than has been possible with prior hulls; another object is to provide a boat hull with a lifting effect producing tunnel having a shape, area and volume calculated to allow the use of relatively small area low drag planing surfaces shaped and formed to further reduce the drag or resistance of the hull to forward motion and high speeds; and another object is to provide a strong, light weight, high speed power boat hull which can be manufactured and sold at a cost comparable to slower and less efficient boat hulls.

Other objects and advantages of my hull will appear from a perusal of the following description and the drawings.

Figure 1 is a side elevational view of a popular size of speed boat hull formed according to the principles of my invention.

Figure 2 is a bottom plan view of the boat shown in Figure 1.

Figures 3 and 4 are respectively front and rear views of the boat shown in Figure 1.

Figures 5 and 6 are respectively cross sectional views, taken on the lines 5—5 and 6—6 of Figure 1.

To meet the demand for speedier boats, manufacturers of inboard and outboard motors have continuously increased and intend to further increase the horsepower of their motors, but while more recent improvements in the construction of boat hulls, together with the use of more horsepower, has increased the top speed of prior boats somewhat, the increase in top speed has not been proportionate to the increase in horsepower. For this reason it appears obvious that merely increasing the horsepower used with prior boats will not efficiently produce the desired high speeds.

Accordingly, to fill this desire for higher boat speeds, my boat hull has been designed to be built strongly but lightly by using modern moldable materials and modern molding techniques to more readily provide the hull with certain surfaces which are shaped, located and proportioned to best use heretofore wasted dynamic forces resulting from forward motion of a boat, so that my hull is inherently capable of attaining a higher top speed from a given horsepower than has heretofore been possible.

To illustrate the principles of my invention I have elected to show a popular size, pleasure type of power driven speed boat hull, but it should be understood that the same principles are adaptable to other sizes and types of power driven boat hulls.

Referring now to the drawings, the numeral 10 generally designates a speed boat hull having surfaces formed, shaped and located in accordance with the herein to be described principles of my invention. The internal and superstructure of the boat forms no part of the present invention and will not be described.

The hull 11 of the boat 10, being generally rectangularly shaped, has a length in the order of sixteen feet and a beam in the order of six feet and is formed with upright substantially parallel sides 12 extending between its bow portion 13 and its stern portion 14. The bottom edges 15 of the sides 12 are substantially straight and extend from the stern 14 forwardly for a distance approximating three-quarters of the length of the hull and thereafter curve forwardly and upwardly to form the forward edge and the apices of one of a pair of widely spaced upright V-shaped prows or stem portions 16. A planing surface 17 is formed contiguous and parallel to each side 12, and each surface 17, being preferably inwardly and upwardly inclined and substantially flat throughout its length, has a width in the order of one foot for approximately one-third of the distance from the stern 14 and thereafter its inner side edge 18 gradually diverges outwardly and smoothly merges with the forward end of the associated lower edge 15 at about its juncture with the stem portion 16. The inner side edge 18 of each of the planing surfaces 17 is formed with a substantially upright offset forming wall 19 having a height in the order of two inches for approximately one-third of the distance from the stern 14 and, forwardly thereof, the side walls 19 gradually tilt inwardly and smoothly merge with the sides of the forward end of a curved bottom wall 20. The bottom wall 20 adjoins and transversely spans the space between the walls 19 and the stems 16 and longitudinally spans the space between the bow 13 and the stern 14, and, together with the planing surfaces 17, forms the bottom of the hull. The wall 20 is transversely arched upwardly in the order of one and one-half inches at the stern 14 and forwardly thereof is progressively arched to a maximum in the order of four inches at the bow end of the hull. The forwardly progressive arching is predetermined to provide the wall 20 with an airfoil shaped bottom surface 21 extending for the entire length of the hull, as shown in Figure 2, and as indicated by the broken lines in Figure 1.

The wall 20, together with the stems 16 and the walls 19, thus define a central continuous recess or tunnel 22 in the bottom of my hull. The tunnel 22, being upwardly offset with respect to the planing surfaces 17 by the wall 19 and having a greater area, arching and curvature at its forward end, serves to continuously trap, confine and rearwardly direct substantially all of the water and air displaced by and during forward motion of my hull, and serves to continuously convert the energy imparted to such water by and during its displacement into lifting effects on the tunnel surfaces of my hull.

It will be understood that as the forward speed of my hull increases the volume of the water and air it displaces rearwardly through the tunnel and the energy of these elements each increase in proportion to the speed of the hull until the lifting effect of these elements on the tunnel surface, particularly the lifting effect of the displaced water thereon, is sufficient to cause the hull to enter its planing phase, whereupon, while the volume, energy and lift producing effect of the displaced water on the tunnel surfaces decreases proportionately to further increases in speed the volume, energy and lift producing effect of the displaced air on the tunnel surfaces continues to increase in a predetermined proportion to the decrease in the water lift with the result that my hull is capable of attaining and maintaining a higher top speed than prior hulls.

This utilization or return of the energy of displaced water and air to create coordinated water and air lifting effects on my hull also allows the use of the relatively small area, low drag planing surfaces 17 which, having their forward end portions shaped to further reduce their drag or resistance to forward motion of my hull, contribute to the attainment of a higher top speed.

It will also be understood by those skilled in the art of designing planing type of speed boat hulls that by carefully predetermining the size and shape of the twin stems 16 the area and curvatures of the surface 21 and its offset relation to the planing surfaces 17, the resulting shape and volume of the tunnel 22 will be such that substantially all of the water and air displaced by and during forward motion of my hull will be directed rearwardly through the tunnel 22 and their energies will act cooperatively and continuously on the entire surface 21 to impart predetermined coordinated lifting effects thereon, whereby a hull constructed in accordance with the principle of my invention as herein set forth will advantageously utilize substantially all of the energy of the water and air it displaces, will create less spray, will have greater stability, will steer better and veer less from a selected course at all speeds and will attain and maintain a higher top speed from a given amount of power than has been possible with prior hulls.

It has been found by experiments that when the width of each planing surface approximates about one sixth of the width of the hull, and that when the volume of the tunnel at the stern approximates between one sixth and one twelfth of its volume at the bow the desired results are attained.

The surface 21 may be smooth but is preferably formed with a continuous series of downwardly and rearwardly inclined angularly related pairs of surfaces 24 which at their rear edge each adjoin a substantially upright wall to provide the shoulders or steps 25 and experience indicates that when the width of the surfaces 24 and the height of the walls of the shoulders 25 are in the order of six inches and three-quarter inch respectively and each surface 24, and its shoulder 25 extend outwardly and rearwardly from the longitudinal center line of the hull at an angle approximating forty-five degrees (Figure 2) a minimum of fore and aft oscillation occurs and a maximum conversion of the "energy" of any water and air displaced forwardly by such oscillation is obtained.

The formation of the surface 21 with the surfaces 24 and the shoulders 25 provides the hull with a strong light bottom which requires little or no internal reinforcement.

The bow end of the surface 21 is formed with a transversely disposed depending rib 27 having an upright wall forming a rear shoulder 28 which resists forward motion of water and air displaced by fore and aft oscillation and tends to further reduce such oscillation and pounding of my hull in heavy seas and which also acts to deflect water downwardly and beneath the hull so that it cannot form spray to enter and wet the interior of the hull.

It should be understood that the herein shown and described form of hull is intended to exemplify the principles of my invention and that various modifications of the shape, proportions and arrangement of its bottom surfaces and the shape, area and volume of its return-energy or lift producing tunnel surfaces may be made within the scope of the appended claims, wherein:

I claim:

1. In a rectangularly shaped planing type of speed boat hull; a pair of substantially vertical and parallel outer side walls each formed with a straight bottom edge for a major portion of its length and a forwardly and upwardly curved portion forwardly thereof; a pair of substantially flat bottom planing surfaces each formed contiguous to the straight bottom edge of one side wall, said planing surfaces being relatively narrow with respect to the width of the hull for a minor portion of its length from its stern forwardly, and thereafter being of progressively reduced width to merge with its side wall substantially at the juncture of its straight and curved portions; and a curved central bottom wall extending from the stern to the bow of the hull and extending transversely between and adjoining the inner sides of the planing surfaces and the curved side portions, said wall being progressively curved longitudinally and progressively arched transversely and being progressively offset upwardly above the inner sides of the planing surfaces from the stern forwardly and combining with the inner sides of the planing surfaces and the curved portions of the side walls in forming a central tunnel and a bow stem at each side of its enlarged bow end, said tunnel being of a predetermined shape, area and volume to receive and rearwardly direct therethrough substantially all of the water and air displaced by and during forward motion of the hull, whereby during forward motion of the hull displaced water and air enter the bow end of the tunnel and continuously act on the bottom surface of the wall to continuously convert their energies into predetermined lifting effects on the hull, thereby causing the hull to attain and maintain more speed from a given amount of power.

2. The improvements set forth in claim 1 wherein the planing surfaces are each inwardly and upwardly inclined transversely of the hull throughout their length to facilitate planing and maintaining the hull in a selected path of movement.

3. The improvements set forth in claim 1 wherein the width of each planing surface approximates about one-sixth of the width of the hull and the combined area of these surfaces approximate about one-sixth of the total bottom area of the hull.

4. The improvements set forth in claim 1 wherein the offset forming walls each have a height in the order of two inches throughout the rear one-third of the hull and forwardly thereof gradually tilt inwardly and smoothly merge into the sides of the longitudinally curved and transversely arched bottom wall, and said bottom wall, being progressively curved longitudinally, is progressively arched transversely upwardly therefrom between a distance in the order of one and one half inches at the stern to a distance in the order of four inches at the bow.

5. The improvements set forth in claim 4 wherein the volume of the tunnel at the stern approximates between one-sixth and one-twelfth of its volume at the bow.

6. The improvements set forth in claim 1 wherein the bottom surface of the wall of the tunnel surface is provided with a conforming continuous series of angularly related rearwardly facing shoulders arranged to resist forward motion of water and air displaced forwardly by fore and aft oscillation of the hull, thereby to reduce such oscillation and to convert the energy of such displaced water and air into forward motion of the hull.

7. The improvements set forth in claim 6 wherein the rearwardly facing shoulders have a height in the order of three-quarters of an inch and are formed in angularly related sections, each section diverging outwardly and rearwardly from the longitudinal center line of the hull at an angle approximating 45°.

8. The improvements set forth in claim 1 wherein the bow end of the hull is provided with a transversely disposed depending rib formed with an upright rearwardly facing wall providing a shoulder arranged to resist oscillation and pounding of the hull in heavy seas and to deflect water displaced by the hull downwardlly into the tunnel to prevent formation of spray.

References Cited in the file of this patent

UNITED STATES PATENTS

| | | |
|---|---|---|
| 1,100,457 | Szentpali et al. | June 16, 1914 |
| 1,189,227 | Baker | July 4, 1916 |
| 1,204,355 | Hickman | Nov. 7, 1916 |
| 1,620,349 | Hickman | Mar. 8, 1927 |
| 1,712,281 | Royer | May 7, 1929 |
| 1,743,907 | Alderman | Jan. 14, 1930 |
| 2,367,323 | Apel | Jan. 16, 1945 |
| 2,446,860 | Wallace | Aug. 10, 1948 |
| 2,555,307 | Aylsworth | June 5, 1951 |